(12) United States Patent
Combi et al.

(10) Patent No.: US 7,322,236 B2
(45) Date of Patent: Jan. 29, 2008

(54) PROCESS FOR MANUFACTURING A TRIAXIAL PIEZORESISTIVE ACCELEROMETER AND RELATIVE PRESSURE-MONITORING DEVICE

(75) Inventors: Chantal Combi, Oggiono (IT); Lorenzo Baldo, Bareggio (IT); Dino Faralli, Milan (IT); Flavio Francesco Villa, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/338,614

(22) Filed: Jan. 24, 2006

(65) Prior Publication Data

US 2006/0185428 A1 Aug. 24, 2006

(30) Foreign Application Priority Data

Jan. 25, 2005 (EP) .................................. 05425028

(51) Int. Cl.
*G01P 15/00* (2006.01)
(52) U.S. Cl. ............................ 73/488; 73/146; 340/974
(58) Field of Classification Search .................. 73/146, 73/488; 340/974; 216/13
See application file for complete search history.

(56) References Cited

U.S. PATENT DOCUMENTS

| | | | | |
|---|---|---|---|---|
| 5,352,635 A | | 10/1994 | Tu et al. | 437/228 |
| 5,563,344 A | * | 10/1996 | Kaiser et al. | 73/514.24 |
| 5,567,880 A | | 10/1996 | Yokota et al. | 73/514.33 |
| 5,905,044 A | | 5/1999 | Lee et al. | 437/228 |
| 6,581,465 B1 | * | 6/2003 | Waters et al. | 73/514.26 |
| 6,763,718 B1 | * | 7/2004 | Waters et al. | 73/514.26 |
| 6,853,315 B2 | * | 2/2005 | Schiller et al. | 340/974 |

FOREIGN PATENT DOCUMENTS

DE 102 50 358 A1 5/2004

* cited by examiner

*Primary Examiner*—Andre J. Allen
(74) *Attorney, Agent, or Firm*—Lisa K. Jorgenson; Robert Iannucci; Seed IP Law Group PLLC (57) ABSTRACT

A manufacturing process of a semiconductor piezoresistive accelerometer includes the steps of: providing a wafer of semiconductor material; providing a membrane in the wafer over a cavity; rigidly coupling an inertial mass to the membrane; and providing, in the wafer, piezoresistive transduction elements, that are sensitive to strains of the membrane and generate corresponding electrical signals. The step of coupling is carried out by forming the inertial mass on top of a surface of the membrane opposite to the cavity. The accelerometer is advantageously used in a device for monitoring the pressure of a tire of a vehicle.

24 Claims, 5 Drawing Sheets

| Radius [μm] | $S_l$ [Pa] | $S_t$ [Pa] | Sens [μV/g/V] |
|---|---|---|---|
| 50 | 300 | 54 | 0,9 |
| 100 | 1690 | 298 | 4,9 |
| 150 | 5590 | 990 | 16 |

Fig.12b

| Radius [μm] | $S_l$ [Pa] | $S_t$ [Pa] | Sens [μV/g/V] |
|---|---|---|---|
| 50 | 64 | 10 | 0,2 |
| 100 | 1002 | 163 | 2,9 |
| 150 | 5253 | 856 | 15 |

PROCESS FOR MANUFACTURING A TRIAXIAL PIEZORESISTIVE ACCELEROMETER AND RELATIVE PRESSURE-MONITORING DEVICE

BACKGROUND OF THE INVENTION

1. Field of the Invention

The present invention relates to a process for manufacturing a triaxial piezoresistive accelerometer and the relative pressure-monitoring device, in particular a device for monitoring the pressure of the tires of a motor vehicle, to which the ensuing description will make explicit reference, without any loss of generality.

2. Description of the Related Art

As known, in the automotive field there is an increasing use of devices for monitoring the pressure of tires (generally known as tire-pressure monitoring systems—TPMSs), which are designed to supply a timely communication, to the electronic control unit of the vehicle, of any fault or deviation with respect to the correct values of operation. These monitoring devices generally comprise a pressure sensor installed on the inner surface of the tire and designed to monitor its state of inflation; an appropriate electronic circuit, which reads the data provided by the pressure sensor and communicates with the electronic control unit (generally using radio-frequencies); and a wake-up system, which supplies a start-of-measurement signal to the pressure sensor and a data-collection signal to the electronic circuit connected thereto. In particular, the wake-up system makes it possible to limit the monitoring operation to the time intervals when the vehicle is moving (it is estimated that the average time of effective use of a vehicle is around 5% of the total life of the vehicle), and thus to reduce the energy consumption by the vehicle battery. Known wake-up systems are either of a mechanical type, generally formed by a mass coupled to a spring, or, as in the case of more recent systems, of an electronic type. Wake-up systems of an electronic type comprise an accelerometer arranged so as to detect the centrifugal acceleration of the tire as it turns. An acceleration of intensity higher than a preset threshold indicates a movement condition of the vehicle.

The various components of the device for monitoring pressure are currently made using different technologies and subsequently assembled on an electronic board. The device is then coated with resin and individually packaged. Consequently, the pressure-monitoring device is currently cumbersome (around 10 mm in size) and somewhat complex to produce.

Recently, the use has been proposed, within the pressure-monitoring device, of semiconductor piezoresistive accelerometers made using microfabrication techniques.

As is known, piezoresistive sensors base their operation on piezoresistivity, i.e., the capacity of certain materials to modify their resistivity as the mechanical stresses acting on them vary. In detail, the resistivity decreases when compressive stresses are applied, whereas it increases when tensile stresses are applied.

Semiconductor piezoresistive accelerometers generally comprise a membrane (or diaphragm) suspended over a cavity, and an inertial mass fixed to the membrane, and mobile with one or more degrees of freedom after detecting an acceleration. Piezoresistive elements (generally formed by implanted or diffused regions) are made in the surface region of the membrane and are connected to one another in a Wheatstone-bridge configuration. A deformation of the membrane, caused by the displacement of the inertial mass induced by the acceleration, causes an unbalancing of the Wheatstone bridge, which can be detected by a purposely provided electronic circuit, which derives, from said unbalancing, the desired measurement of acceleration.

A triaxial piezoresistive accelerometer of a known type is, for example, manufactured by Fujikura Ltd. and described in detail in "www.sensorsmag.com/articles/0299/0299_38/main.shtml".

Figures 1, 2:
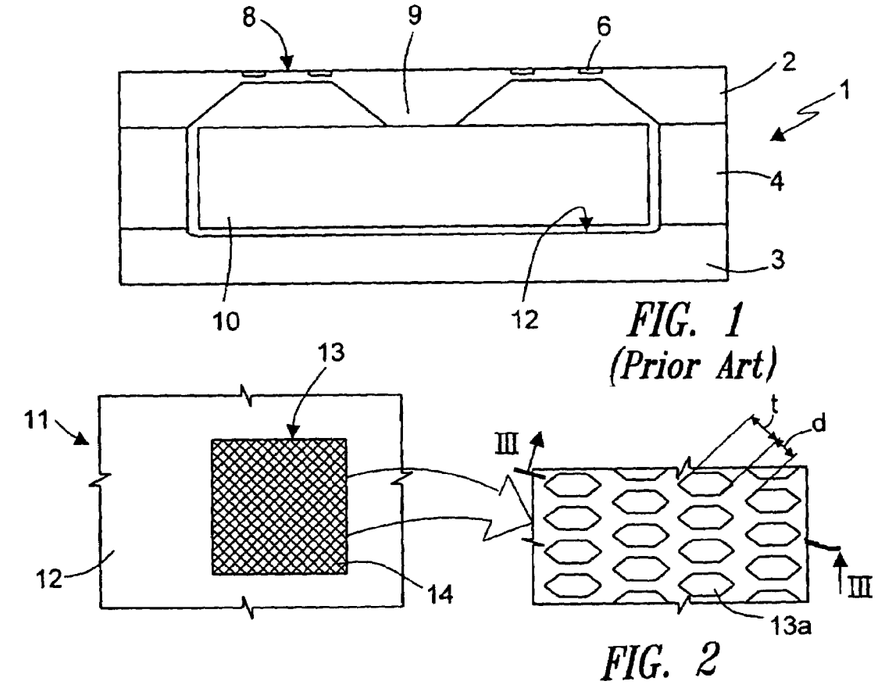
FIG. 1 shows a cross-section of a piezoresistive accelerometer according to a known technique.
FIG. 2 shows a top plan view of a wafer of semiconductor material in an initial step of a process of manufacturing an accelerometer according to the present invention.

This accelerometer is illustrated in FIG. 1, where it is designated as a whole by reference number 1. The accelerometer 1 comprises a first and a second silicon layer 2, 3, between which glass layer 4 is arranged. In particular, the layers are bonded to one another via anodic bonding, and the entire structure is enclosed in a ceramic package (not illustrated in FIG. 1).

In extreme synthesis, the manufacturing process of the accelerometer 1 envisages the diffusion of boron regions in the surface region of the first silicon layer 2 so as to form piezoresistive elements 6 that are connected in a Wheatstone-bridge configuration (not illustrated in FIG. 1). Then, the rear face of the first silicon layer 1 is anisotropically etched so as to form a thin silicon membrane 8. After the etch, a central portion 9 of the first silicon layer 2 remains underneath the membrane 8. Next, the glass layer 4 is bonded to the rear surface of the first silicon layer 2 via anodic bonding and the layer of glass 4 is cut on the rear side (opposite to the bonding side), so as to form an inertial mass 10 at the center of the structure of the accelerometer 1, underneath the membrane 8. In particular, the inertial mass 10 is etched only at the central portion 9. Finally, the second silicon layer 3 is bonded via anodic bonding underneath the layer of glass 4, which has the function of base and of mechanical protection for the accelerometer 1. At the inertial mass 10, the second silicon layer 3 has a cavity 12, appropriately made before bonding, so as to ensure freedom of movement to the inertial mass 10. The distance between the inertial mass 10 and the second silicon layer 3 is such as to limit the movement of the inertial mass 10 in a transverse direction, to prevent the membrane 8 from getting damaged in case of excessive accelerations.

An acceleration imparted upon the accelerometer 1 causes a displacement of the inertial mass 10, and a consequent deformation of the membrane 8. Due to this deformation, the piezoresistive elements 6 vary their resistivity, so unbalancing the Wheatstone bridge.

The accelerometer 1 described, even though it is certainly more compact than wake-up systems of a mechanical type, has in any case large dimensions on account of the need to carry out a bonding of three different layers (two layers of silicon and one layer of glass) and on account of the presence of a ceramic package, and entails a manufacturing process that is somewhat complex and costly. Furthermore, the accelerometer 1 cannot be readily integrated with the electronic read circuit. These disadvantages are particularly evident as regards the considered automotive applications, wherein low cost and simplicity of production are a constraint in the choice of the components to be used.

BRIEF SUMMARY OF THE INVENTION

One embodiment of the present invention provides an accelerometer overcoming the aforesaid disadvantages and problems, and in particular simple and inexpensive to manufacture, and simple to integrate within a pressure-monitoring device, in particular for automotive applications.

According to the present invention, there are consequently provided a process for manufacturing an accelerometer as defined in claim 1, and an accelerometer as defined in claim 9.

According to the present invention, a pressure-monitoring device is moreover provided, as defined in claim 15.

BRIEF DESCRIPTION OF THE SEVERAL VIEWS OF THE DRAWINGS

For a better understanding of the present invention, a preferred embodiment thereof is now described, purely by way of non-limiting example and with reference to the attached plate of drawings, wherein:

FIGS. 9a-10a are schematic representations of a portion of the wafer of FIG. 7, when subjected to accelerations;

FIGS. 9b-10b show the bridge configuration of piezoresistive elements of the wafer of FIG. 7;

DETAILED DESCRIPTION OF THE INVENTION

Hereinafter an embodiment is described of a manufacturing process of a triaxial piezoresistive accelerometer of semiconductor material. The manufacturing process is based upon the process described in EP-A-1 324 382, for manufacturing a SOI wafer, and on the process described in European patent application No. 04 425 197.3 filed in the name of the present applicant on 19 Mar. 2004, for manufacturing a pressure sensor.

FIG. 2 shows a wafer 11 of semiconductor material, for example monocrystalline silicon, comprising a substrate 12, for example of N type.

Figures 3, 4:
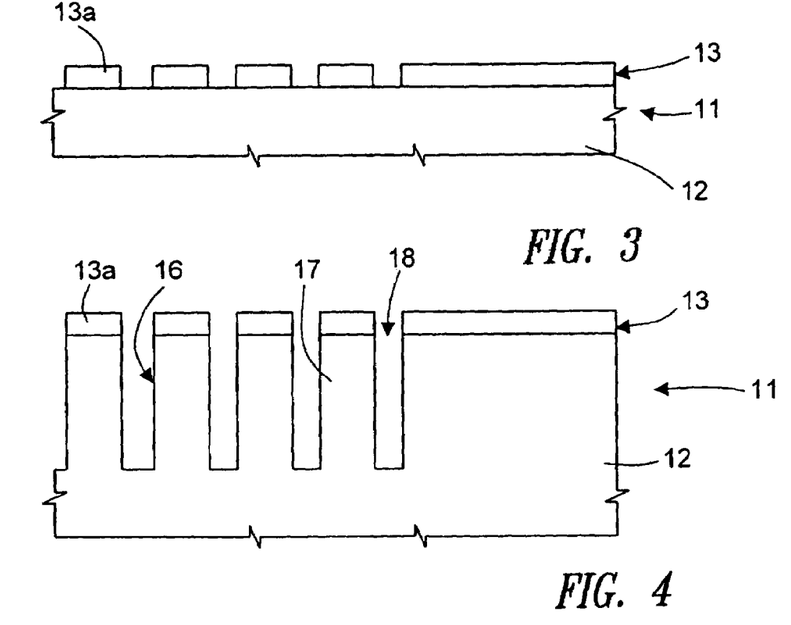
FIGS. 3-7 are cross-sections through the wafer of FIG. 2 in subsequent steps of the manufacturing process according to the present invention.

In an initial step of the manufacturing process, a resist mask 13 is made on the wafer 11 (reference may also be made to the cross-section of FIG. 3). In detail, the mask 13 has an approximately square area 14 comprising a plurality of hexagonal mask portions 13a that define a honeycomb lattice (as visible in the enlarged detail of FIG. 2). For example, the distance t between opposite sides of the mask portions 13a is 2 µm, while the distance d between facing sides of adjacent mask portions 13a is 1 µm.

Next (reference is made to FIG. 4), using the mask 13, the substrate 12 is anisotropically etched, thereby forming trenches 16, having for example a depth of 10 µm, which communicate with one another and delimit a plurality of columns 17 of silicon. In practice, the trenches 16 form an open region 18 of a complex shape (corresponding to the honeycomb lattice of the mask 13) accommodating the columns 17 (with the same as the mask portions 13a).

Next (FIG. 5), the mask 13 is removed and an epitaxial growth is performed in a de-oxidizing environment (typically, in an atmosphere with a high concentration of hydrogen, preferably with trichlorosilane—$SiHCl_3$). Consequently, an epitaxial layer 20, for example of an N type and having a thickness of 9 µm, grows on top of the columns 17 and closes the open region 18 at the top. The epitaxial layer 20 is shown only in FIG. 5 and thereafter not distinguished from the substrate 12.

Figure 5:
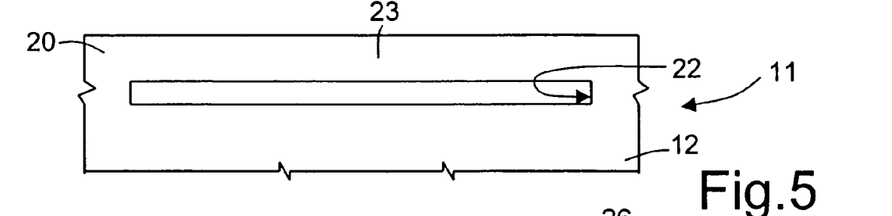

A thermal annealing is then performed, for example for 30 minutes at 1190° C., preferably in a hydrogen atmosphere, or alternatively a nitrogen atmosphere.

As discussed in the aforementioned patent applications, the annealing causes a migration of the silicon atoms, which tend to move into the lower energy position. Consequently, and also thanks to the small distance between the columns 17, the silicon atoms migrate completely from the portions of the columns 17 within the open region 18, and a buried cavity 22 is formed, having a side of for example 500 µm. A thin silicon layer remains on top of the buried cavity 22 and forms a membrane 23, that is formed in part by epitaxially grown silicon atoms and in part by migrated silicon atoms. The membrane 23 is flexible and can undergo deflection in presence of external stresses.

Figure 6:
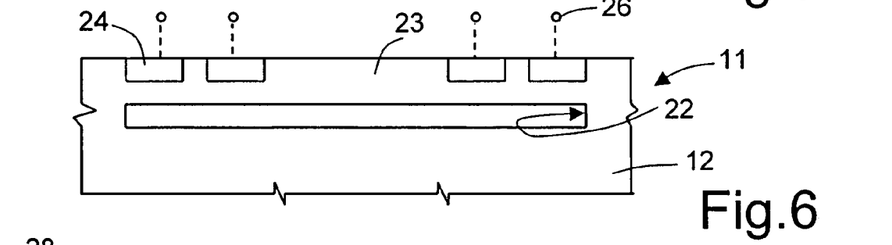

Next (FIG. 6), piezoresistive elements 24 are formed in a surface portion of the membrane 23 opposite to the cavity 22. In detail, the piezoresistive elements 24 are obtained by diffusion or implantation of P type, for example of boron atoms, and are connected to one another in a Wheatstone-bridge configuration, as will be explained in detail hereinafter. In FIG. 6, the interconnections 26 between the piezoresistive elements 24 (typically formed by metal regions extending on an insulating layer, not illustrated) are represented in a schematic way. Furthermore, as an alternative to what is illustrated, the piezoresistive elements 24 can be made of polysilicon on top of the membrane 23.

Next (FIG. 7), according to one aspect of the present invention, on top of the membrane 23 an inertial mass 25 is deposited, using a silk-screen printing technique, and is formed by welding paste, for example of silver, tin, copper, lead, gold, or of other high-density metals (preferably having a density higher than 7000 $kg/m^3$). For example, the welding paste is commonly used in the fabrication of packages of electronic components.

Figure 7:
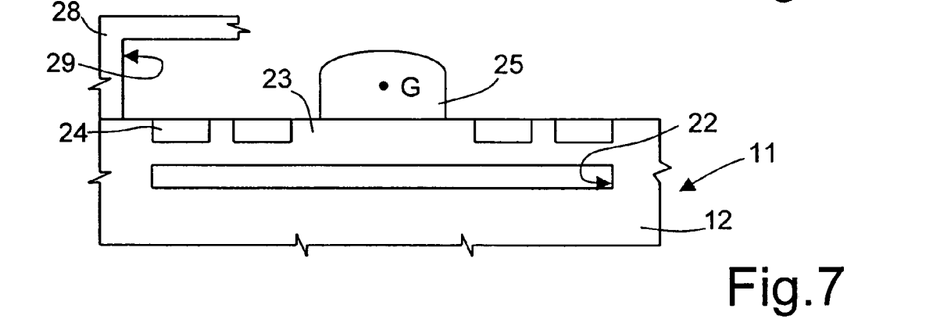

In detail, the inertial mass 25 is deposited approximately at the geometrical center of the membrane 23 through a metal mesh (not illustrated), for example of nickel or steel, which has suitable openings at the deposition areas of the welding paste.

Deposition is accompanied by an increase in temperature, during which the inertial mass 25 adheres to the top surface of the membrane 23. After cooling, the shape of the inertial mass 25 (as illustrated in FIG. 7 and in the top plan view of FIG. 8) comprises a cylindrical base portion and a hemispherical top portion. In particular, the inertial mass 25 has a height such that its centroid G is located outside of the membrane 23. The shape of the inertial mass 25 is given not only by the size of the openings of the metal mesh used for its deposition, but also by the surface tensile stresses created between the inertial mass 25 and the membrane 23, and by the resting base of the inertial mass 25 on the membrane 23.

Next, a covering region 28, for example of semiconductor material or glass, can possibly be bonded via anodic bonding to the top surface of the wafer 11, for ensuring a mechanical protection for the sensing structure. In particular, the covering region 28 has a cavity 29 at the membrane 23, so as to not alter the freedom of movement.

Figure 8:
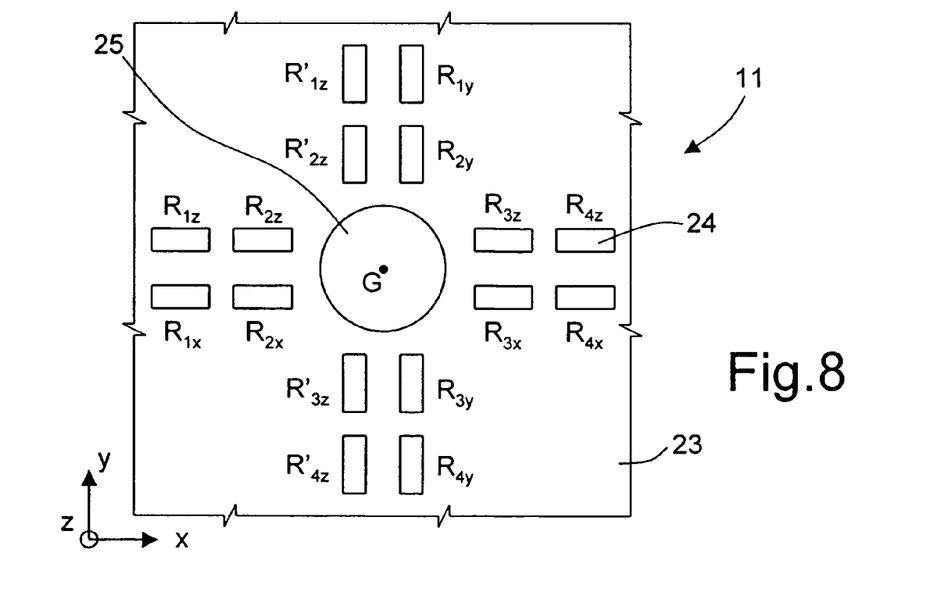
FIG. 8 shows a top plan view of the wafer of FIG. 7.

FIG. 8 shows a top plan view of the wafer 11, highlighting the arrangement of the piezoresistive elements 24 with respect to the inertial mass 25. The axes x, y and z of a Cartesian reference system associated to the wafer 11 are also shown in FIG. 8. In particular, the top surface of the wafer 11 lies in the plane xy.

In detail, the piezoresistive elements 24 are arranged to form a cross along the axes x and y, and the inertial mass 25 is located at the center thereof. Each arm of the cross is formed by two groups of four piezoresistive elements 24 aligned and connected to one another in a Wheatstone-bridge configuration. As will be described in detail hereinafter, the piezoresistive elements 24, designated by $R_{1x}$-$R_{4x}$, refer to the detection of an acceleration along the axis x, the ones designated by $R_{1y}$-$R_{4y}$ refer to the detection of an acceleration along the axis y, and the ones designated by $R_{1z}$-$R_{4z}$ and $R_{1z}'$-$R_{4z}'$ refer to the detection of an acceleration along the axis z. Consequently there are present a Wheatstone bridge for detecting an acceleration along the axis x and the axis y, and two Wheatstone bridges connected in common mode for detecting an acceleration along the axis z.

Operation of the above triaxial accelerometer is described hereinafter (see FIGS. 9 and 10).

Figure 9A:
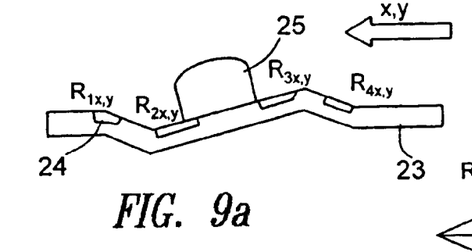
Figure 9B:
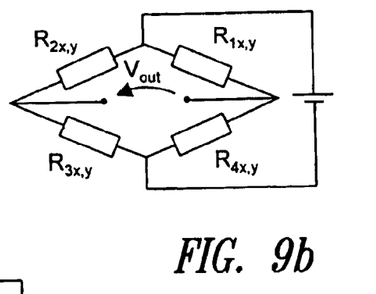

Since the centroid G of the inertial mass 25 is located outside of the membrane 23, an acceleration directed along the axis x or the axis y acting on the accelerometer brings about a momentum on the inertial mass 25, which causes inclination thereof in the corresponding direction (as illustrated in FIG. 9a). The displacement of the inertial mass 25 brings about a corresponding deformation of the membrane 23 and a variation in the resistivity of the piezoresistive elements 24 arranged along the direction of the acceleration. In particular, the piezoresistive elements $R_{1x}$/$R_{1y}$ and $R_{3x}$/$R_{3y}$ undergo a tensile stress, which increases their own resistivity, while the piezoresistive elements $R_{2x}$/$R_{2y}$ and $R_{4x}$/$R_{4y}$ undergo a compressive stress, which decreases their own resistivity. As illustrated in FIG. 9b, the piezoresistive elements 24 referred to above are arranged in a Wheatstone-bridge configuration so as to increase the sensitivity of the bridge, i.e., elements with resistivities which undergo opposite variations are arranged in adjacent arms of the bridge.

Figure 10A:
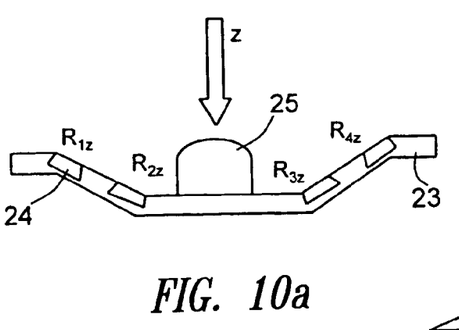
Figure 10B:
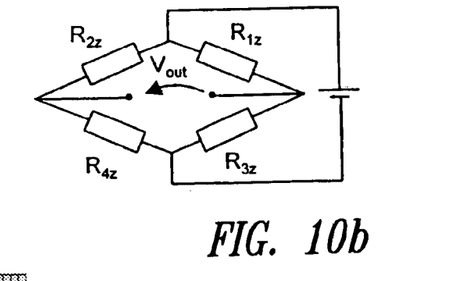

Likewise, an acceleration directed along the axis z acting on the accelerometer causes a corresponding displacement of the inertial mass 25 and a consequent deformation of the membrane 23, as illustrated in FIG. 10a. In this case, the piezoresistive elements $R_{1z}$ and $R_{4z}$ undergo a tensile stress, that increases their own resistivity, while the piezoresistive elements $R_{2z}$ and $R_{3z}$ undergo a compressive stress, that decreases their own resistivity. FIG. 10b shows the corresponding arrangement in a Wheatstone-bridge configuration of the piezoresistive elements 24 mentioned above.

It should be noted that, since the buried cavity 22 has a thickness of a few microns, the possibility of deflection of the membrane in the direction of the axis z is limited. In this way, a mechanical constraint is created that limits the amplitude of the displacements along the axis z, to prevent any possible failure of the accelerometer.

Figure 11:
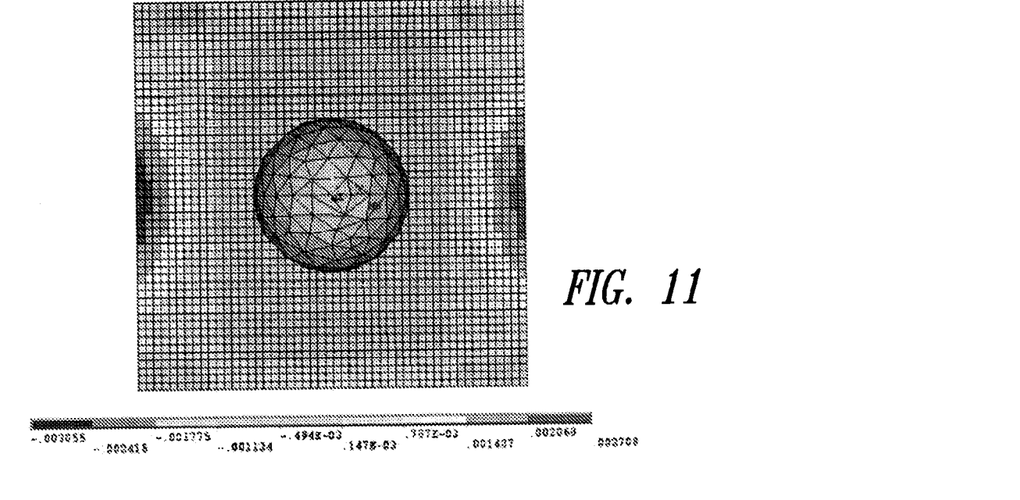
FIG. 11 shows a diagram corresponding to the distribution of the strains acting on a membrane portion of the wafer of FIG. 7 when this is subjected to accelerations.

FIG. 11 shows the distribution of the stresses acting on the membrane 23 upon application of an acceleration of 5 g along the axis z. As may be noted, the intensity of the compressive stress has a maximum value in the neighborhood of the inertial mass 25 (represented as a spheroid in FIG. 11), while the intensity of the tensile stress is maximum at the peripheral edges of the membrane 23. The piezoresistive elements $R_{1z}$-$R_{4z}$ are consequently formed at the regions of the membrane 23 that are subjected to the stresses of maximum intensity. Similar considerations apply to the piezoresistive elements 24 corresponding to the axes x and y.

In a per se known and not illustrated manner, the unbalancing of the Wheatstone bridge is then detected by an appropriate electronic circuit, generally comprising an instrumentation amplifier, which receives the unbalancing voltage $V_{out}$ of the Wheatstone bridge; the desired information of acceleration is then derived from the unbalancing.

The sensitivity Sens of the accelerometer is directly affected by the dimensions of the inertial mass 25. In particular, the sensitivity Sens increases as the inertial mass 25 increases, in so far as the consequent deformation of the membrane 23 increases, but only up to a certain limit, beyond which the dimensions of the inertial mass 25 become such as to stiffen the membrane 23 excessively and to limit its freedom of movement.

Figure 12A:
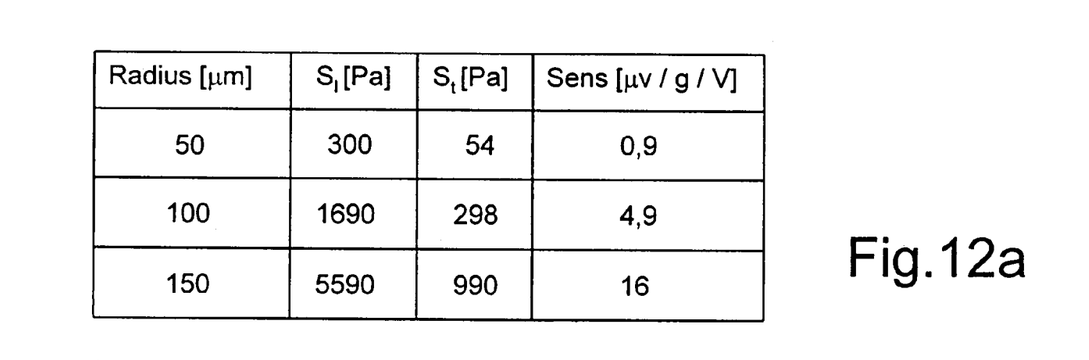
FIGS. 12a and 12b are tables of sensitivity values of the accelerometer according to the present invention.
Figure 12B:
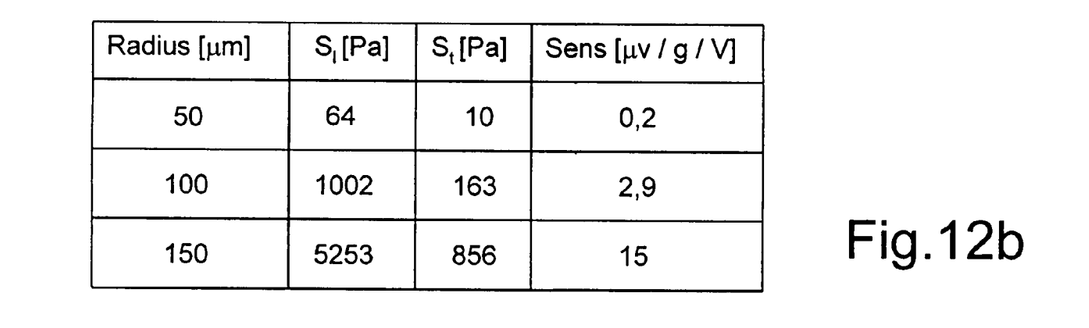

The tables of FIGS. 12a and 12b illustrate the value of the sensitivity Sens of the accelerometer as the radius of the inertial mass 25 (again shown as a spheroid) varies, respectively for an acceleration acting in the plane xy and for an acceleration acting in the direction z. The value of sensitivity is normalized with an acceleration of 5 g and a voltage of 5 V, and is expressed in µV/g/V. The tables give moreover the values, expressed in Pa, of the longitudinal stresses $S_l$ and of the transverse stresses $S_t$ (corresponding to the position of the piezoresistive elements 24 in the plane xy) to which the membrane 23 is subjected.

From the tests conducted by the applicant, it emerges that, in order to obtain a higher sensitivity Sens of the accelerometer, it is convenient to use inertial masses 25 having a radius of between 100 µm and 200 µm. With reference to the dimensions of the membrane 23 (the side whereof is approximately 500 µm), the accelerometer is found to have a higher sensitivity when the ratio between the radius of the inertial mass 25 and the side of the membrane 23 is between 20% and 40% (or, likewise, the ratio between the diameter of the inertial mass 25 and the side of the membrane 23 is between 40% and 80%). Furthermore, it emerges that the sensitivity of the accelerometer is higher along the axis z than along the axes x and y.

The accelerometer described can be used in a device for monitoring the inflation pressure of the tires of a vehicle.

Figure 13:
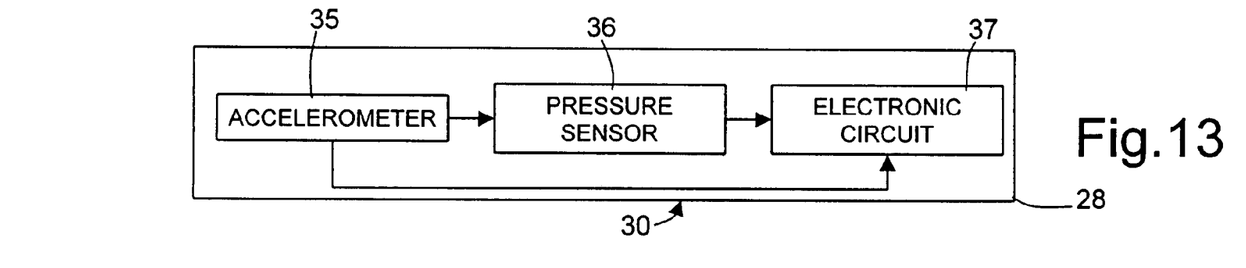
FIG. 13 shows a block diagram of a pressure-monitoring device according to the present invention.

In detail, as illustrated in FIG. 13, a pressure-monitoring device 30 comprises an accelerometer 35, made as described previously and designed to detect the centrifugal acceleration of a tire (not illustrated); a pressure sensor 36, of piezoresistive type, connected to the accelerometer 35 and designed to measure the pressure of inflation of the tire; and an electronic circuit 37, connected to the accelerometer 35 and to the pressure sensor 36 and communicating with the electronic control unit of the motor vehicle (not shown), for example via radio-frequencies. In particular, the pressure-monitoring device 30 is arranged at the inner surface of the tire, so that the accelerometer 35b detects the centrifugal acceleration along the axis z due to the rotation of the tire.

The technology used for manufacturing the accelerometer 35 is substantially similar to the one used for the pressure sensor 36 (see in this regard the aforementioned European patent application No. 04 425 197.3). Consequently, integration of the pressure sensor and of the accelerometer according to the present invention in a same substrate of semiconductor material proves simple and economically advantageous. Furthermore, also the electronic circuit 37 can be readily integrated in the same substrate, rendering the pressure-monitoring device 30 extremely compact and simple and fast to produce.

Figures 14, 15:
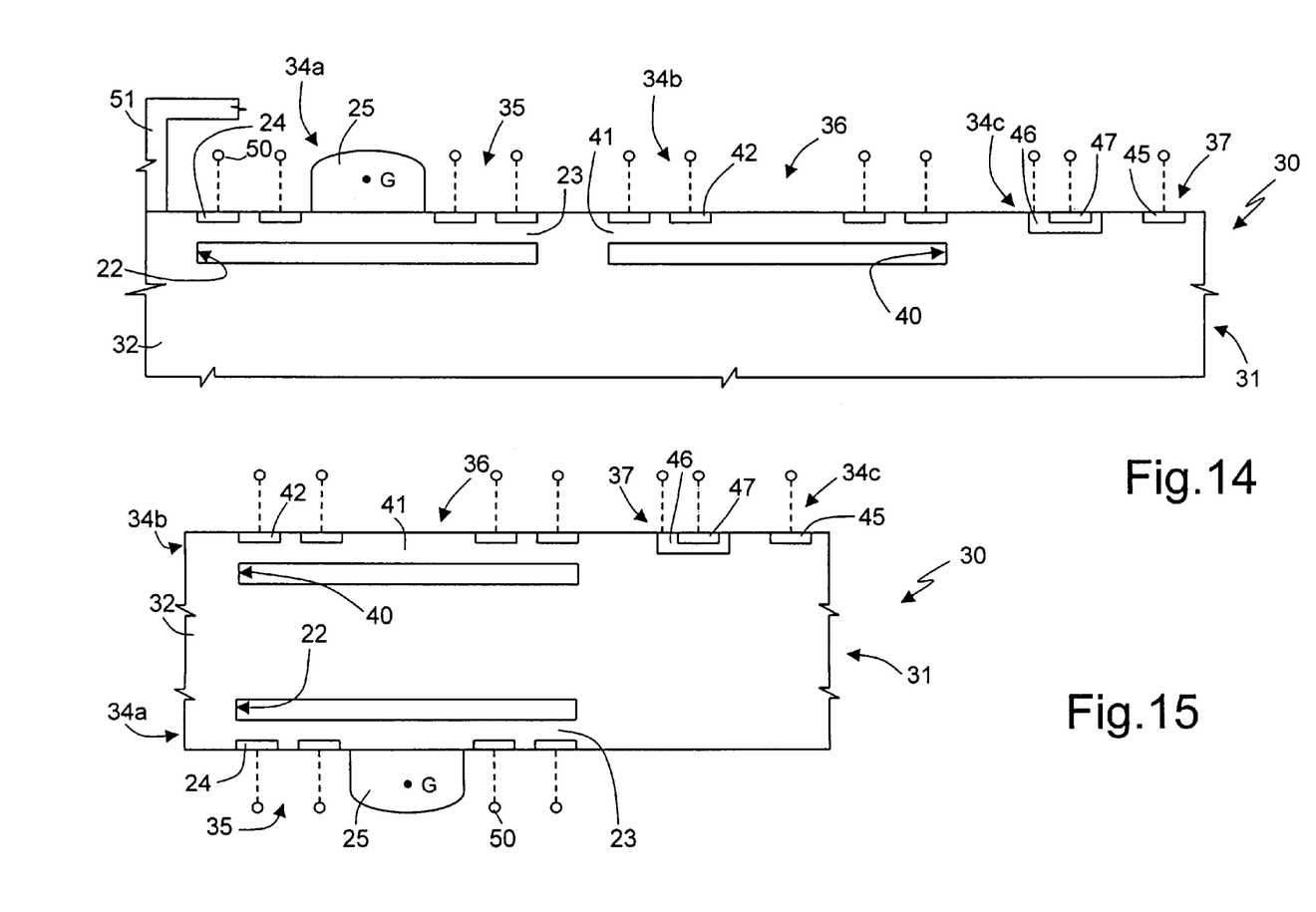
FIG. 14 is a cross-section through a wafer of semiconductor material accommodating a pressure-monitoring device according to a first embodiment of the present invention.
FIG. 15 shows a second embodiment of the pressure-monitoring device of FIG. 14.

FIG. 14 shows the pressure-monitoring device 30 integrated in a wafer 31 of semiconductor material, for example of monocrystalline silicon, which comprises a substrate 32, for example of an N type.

Within the wafer 31 three regions may be distinguished: a first region 34a, accommodating an accelerometer 35 made as described with reference to FIGS. 2 to 7 (so that parts that are similar are designated by the same reference numbers); a second region 34b, accommodating a piezoresistive pressure sensor 36; and a third region 34c, accommodating an electronic circuit 37.

In detail, the pressure sensor 36 comprises a buried cavity 40, a membrane 41, and piezoresistive elements 42 diffused or implanted within the membrane 41. Advantageously, a fair number of the manufacturing process of the pressure sensor 36 and of the accelerometer 35 are in common (for example, forming the trenches, annealing, depositing the piezoresistive elements, etc.).

The electronic control circuit 37 (FIG. 14 shows only by way of example an NPN transistor comprising a collector region 45 of an N type, a base region 46 of a P type, and an emitter region 47 of an N type) is also made using manufacturing steps in common with the process of the accelerometer 35 and of the pressure sensor 36. For example, the diffusion of the base region 46 is performed simultaneously with the diffusion of the piezoresistive elements. In a way not illustrated in FIG. 14, electrical-insulation regions can be envisaged for insulating electrically the electronic control circuit 37 from the second region 34b.

At the end of the manufacturing process, after depositing the inertial mass 25 of the accelerometer 35, appropriate electrical-contact regions 50 (illustrated schematically) are made for the electrical connection of the accelerometer 35, of the pressure sensor 36, and of the electronic control circuit 37. Further electrical-contact regions are provided for the electrical connection of the electronic circuit 37 with the outside world (in particular with the electronic control unit of the vehicle, not illustrated herein).

The wafer 31 can then be encapsulated in a package 51 (illustrated schematically in FIG. 14) so that only the membrane 41 of the pressure sensor 36 is accessible from the outside, while the remaining components are mechanically protected.

The above triaxial piezoresistive accelerometer and the pressure-monitoring device have the following advantages.

In particular, the accelerometer has extremely reduced dimensions, since it is integrated in a single substrate and does not need bonding of wafers of different materials. Furthermore, the fabrication of the inertial mass using welding paste of high-density metals enables, for a same sensitivity, to reduce the dimensions of the inertial mass as compared to when other materials having a lower density (for example silicon) are used. The manufacturing process is extremely simple and inexpensive, and furthermore, the particular construction is compatible with packaging techniques at the substrate level, such as the bump-bonding or flip-chip techniques, which enable a further reduction in the dimensions. Furthermore, the sensitive part of the sensor is automatically and mechanically protected on the back of the wafer because of the presence of the buried cavity within the substrate.

The pressure-monitoring device is, in turn, extremely compact, thanks to the integration of all the components, including the electronic control circuit, in a single body of semiconductor material. In this way, it is possible to reach dimensions smaller than 1 mm. Furthermore, the manufacturing process is simpler and faster, since process steps for obtaining the various components of the device are in common. The resulting chip can also be connected with flip-chip techniques.

Finally, it is clear that modifications and variations can be made to the process and device described and illustrated herein, without thereby departing from the scope of the present invention, as defined in the annexed claims.

In particular (see FIG. 15), a second embodiment of the pressure-monitoring device 30 provides for forming the accelerometer 35 on the back of the wafer 31, so as to obtain a further reduction of the occupied area. In detail, the manufacturing process according to the second embodiment comprises first forming the pressure sensor 36 in a front surface portion of the wafer 31. Then, after coating the top surface of the wafer 31 with a sheet of protective material, the wafer 31 is turned upside down (this is possible given the planarity of the pressure sensor 36 and the absence of any projecting portions), so as to obtain the accelerometer 35 on the back of the wafer 31. In particular, the annealing steps can advantageously be made simultaneously for both of the sensors.

In addition, the geometrical shape of the membrane can be different, for example can be circular or generically polygonal; also the shape of the inertial mass can differ from the one described and can be, for example, cylindrical.

The shape of the columns 17 can vary with respect to the one illustrated; for example the columns 17 can be replaced by diaphragms of semiconductor material of small thickness, or in general by other thin structures (walls) such as to enable migration of silicon during the annealing step and formation of the deep cavity 22.

Furthermore, it is clear that the described accelerometer can advantageously be used in other applications, in particular in all those applications that require reduced overall dimensions and costs. For example, it can be used in a wake-up system of a portable device, or for detection of a free fall of the portable device.

Finally, the described pressure-monitoring device can be used for other applications. For example, in the automotive field, it can be used for monitoring the pressure of the air-bag, for controlling the breakdown pressure of the ABS, and for monitoring the pressure of the oil or the pressure of fuel injection.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A manufacturing process of a semiconductor piezoresistive accelerometer, comprising:
   providing a wafer of semiconductor material;
   providing a membrane in said wafer on top of a cavity, the membrane having a first surface facing said cavity and a second surface opposite said first surface;
   coupling an inertial mass in a rigid way to said membrane; and
   providing, in said wafer, piezoresistive transduction elements sensitive to strains of said membrane and generating corresponding electrical signals;
   wherein said coupling includes forming said inertial mass on said second surface of said membrane.

2. The process according to claim 1, wherein said forming comprises silk-screen printing said inertial mass directly on top of said second surface.

3. The process according to claim 1, wherein said forming comprises depositing a welding paste of metal.

4. The process according to claim 3, wherein said metal is chosen in a group comprising silver, tin, copper, lead, and gold, and has a density higher than 7000 kg/m$^3$.

5. The process according to claim 1, wherein said depositing comprises depositing said inertial mass substantially at a center of said membrane.

6. The process according to claim 1, wherein said cavity is a buried cavity that is formed during said providing the membrane.

7. The process according to claim 6, wherein said forming a buried cavity comprises:
digging trenches delimiting between them walls of semiconductor material;
epitaxially growing, starting from said walls, a closing layer of semiconductor material, said closing layer closing said trenches at the top and forming said membrane; and
carrying out a thermal treatment such as to cause migration of the semiconductor material of said walls and form said buried cavity.

8. The process according to claim 6, wherein said forming said inertial mass is performed after said forming said buried cavity.

9. The process according to claim 1, wherein said providing piezoresistive transduction elements comprises providing piezoresistors in a surface portion of said membrane; said membrane having a first conductivity type and said providing piezoresistors includes introducing ionic dopant species of a second conductivity type.

10. A semiconductor piezoresistive accelerometer, comprising:
a body of semiconductor material;
a cavity formed in said body;
a membrane formed in said body and suspended above said cavity, the membrane having a first surface facing said cavity and a second surface opposite said first surface;
an inertial mass fixedly coupled to said membrane; and
piezoresistive transduction elements integrated in said body, sensitive to strains of said membrane and generating corresponding electrical signals;
wherein said cavity is buried within said body of semiconductor material, and said inertial mass is arranged on said second surface of said membrane.

11. The accelerometer according to claim 10, wherein said inertial mass comprises a welding paste of metal, deposited directly on top of said second surface.

12. The accelerometer according to claim 11, wherein said metal is chosen in a group comprising silver, tin, copper, lead, and gold, and has a density higher than 7000 kg/m$^3$.

13. The accelerometer according to claim 10, wherein said surface of said membrane defines a plane and has at least one principal dimension belonging to said plane, and said inertial mass has at least one respective principal dimension parallel to said plane; and wherein a ratio between said principal dimensions of said inertial mass and of said membrane is comprised between 40% and 80%.

14. The accelerometer according to claim 10, wherein said inertial mass is set substantially at a center of said membrane.

15. The accelerometer according to claim 10, wherein said accelerometer is a triaxial accelerometer.

16. The accelerometer according to claim 10, wherein the body of semiconductor material and the membrane each comprise monocrystalline silicon.

17. A pressure-monitoring device, comprising:
a pressure sensor;
an electronic circuit connected to said pressure sensor; and
an accelerometer connected to the electronic circuit, the accelerometer including:
a body of semiconductor material;
a cavity formed in said body;
a membrane formed in said body and suspended above said cavity, the membrane having a first surface facing said cavity and a second surface opposite said first surface;
an inertial mass fixedly coupled to said membrane; and
piezoresistive transduction elements integrated in said body, sensitive to strains of said membrane and generating corresponding electrical signals;
wherein said cavity is buried within said body of semiconductor material, and said inertial mass is arranged on said second surface of said membrane.

18. The device according to claim 17, wherein said pressure sensor and said electronic circuit are integrated in the body of semiconductor material.

19. The device according to claim 18, wherein said pressure sensor is made in a first region of said body and said accelerometer is made in a second region of said body; said first region and said second region being both arranged in a surface portion of said body.

20. The device according to claim 18, wherein said pressure sensor is made in a first surface portion of said body and said accelerometer is made in a second surface portion of said body, opposite to said first surface portion.

21. An apparatus for monitoring an inflation pressure of a tire of a vehicle, comprising:
a pressure sensor;
an electronic circuit connected to said pressure sensor; and
an accelerometer connected to the electronic circuit, the accelerometer including:
a body of semiconductor material;
a cavity formed in said body;
a membrane formed in said body and suspended above said cavity;
an inertial mass fixedly coupled to said membrane; and
piezoresistive transduction elements integrated in said body, sensitive to strains of said membrane and generating corresponding electrical signals;
wherein said cavity is buried within said body of semiconductor material, and said inertial mass is arranged on top of a surface of said membrane opposite to said cavity, wherein said pressure sensor measures the inflation pressure of said tire, and said accelerometer measures a centrifugal acceleration caused by rotations of said tire.

22. The apparatus according to claim 21, wherein said pressure sensor and said electronic circuit are integrated in the body of semiconductor material.

23. The apparatus according to claim 22, wherein said pressure sensor is made in a first region of said body and said accelerometer is made in a second region of said body; said first region and said second region being both arranged in a surface portion of said body.

24. The apparatus according to claim 22, wherein said pressure sensor is made in a first surface portion of said body and said accelerometer is made in a second surface portion of said body, opposite to said first surface portion.

* * * * *